United States Patent
Laflamme et al.

(12) 
(10) Patent No.: US 6,488,408 B1
(45) Date of Patent: Dec. 3, 2002

(54) TEMPERATURE PROBE MOUNTING DEVICE FOR HOT TUB SPA

(75) Inventors: Benoit Laflamme, Turnbull (CA); Sylvain Ringuet, Neufchatel (CA)

(73) Assignee: Gecko Electronique, Inc., Quebec (CA)

( * ) Notice: Subject to any disclaimer, the term of this patent is extended or adjusted under 35 U.S.C. 154(b) by 0 days.

(21) Appl. No.: 09/680,674

(22) Filed: Oct. 6, 2000

(51) Int. Cl.⁷ .................................................. G01K 1/14
(52) U.S. Cl. .................... 374/150; 374/183; 374/208; 4/496
(58) Field of Search ........................ 374/150, 208, 374/148, 147, 141, 183; 4/496

(56) References Cited

U.S. PATENT DOCUMENTS

| | | | | |
|---|---|---|---|---|
| 1,233,385 A | * | 7/1917 | Maurer .......................... | 374/208 |
| 4,841,274 A | * | 6/1989 | Yagher, Jr. et al. ........... | 374/208 |
| 5,046,857 A | * | 9/1991 | Metzger et al. ............... | 374/208 |
| 5,340,019 A | * | 8/1994 | Bohan, Jr. et al. ........... | 374/208 |
| 5,558,436 A | * | 9/1996 | Richards ...................... | 374/208 |
| 5,667,306 A | * | 9/1997 | Motreuil et al. .............. | 374/208 |
| 5,720,556 A | * | 2/1998 | Krellner ........................ | 374/208 |
| 5,743,646 A | * | 4/1998 | O'Connell et al. ........... | 374/208 |
| 5,829,880 A | * | 11/1998 | Diedrich ....................... | 374/208 |
| 6,282,370 B1 | * | 8/2001 | Cline et al. .................... | 392/465 |

FOREIGN PATENT DOCUMENTS

| | | | | |
|---|---|---|---|---|
| DE | 243407 A3 | * | 3/1987 | .................. 374/208 |
| DE | 3709739 A1 | * | 10/1988 | .................. 374/208 |
| EP | 52369 A2 | * | 5/1982 | .................. 374/208 |
| GB | 2045433 A | * | 10/1980 | .................. 374/208 |

* cited by examiner

*Primary Examiner*—Diego Gutierrez
*Assistant Examiner*—Stanley J. Pruchnic, Jr.
(74) *Attorney, Agent, or Firm*—John R. Ross; John R. Ross, III

(57) ABSTRACT

A device for measuring the temperature of the water inside a water container. A temperature probe that defines a front end and a rear end has its front end exposed to water inside the water container. A temperature probe mount mounts the temperature probe to the side of the water container and allows access of the front end of the temperature probe to the water inside the water container. A temperature probe insulator fits over the rear end of the temperature probe. The temperature probe insulator attaches to the temperature probe mount and prevents rearward motion of the temperature probe. In a preferred embodiment, the water container is a spa. In a preferred embodiment, the temperature probe insulator is made of a rubbery substance.

8 Claims, 4 Drawing Sheets

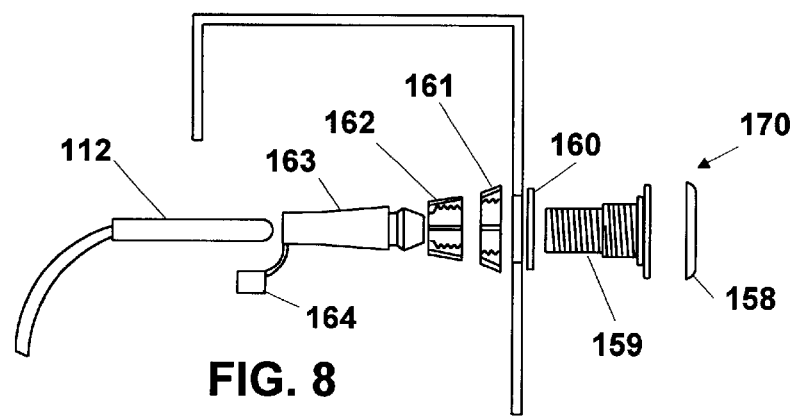
FIG. 8
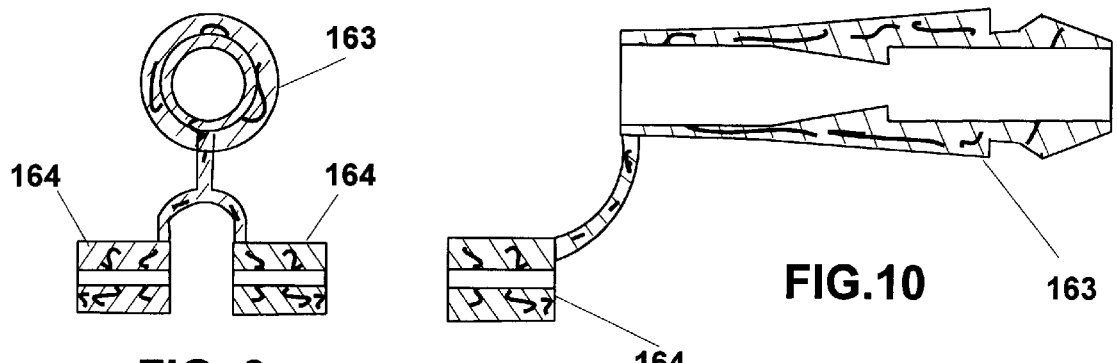
FIG. 9
FIG. 10
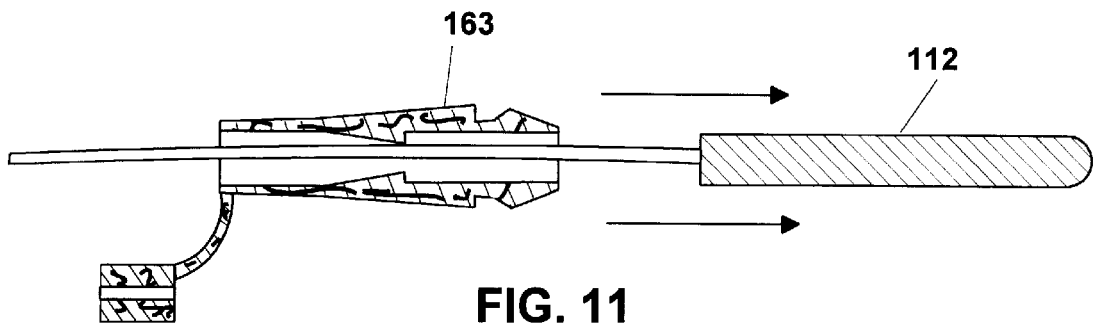
FIG. 11

TEMPERATURE PROBE MOUNTING DEVICE FOR HOT TUB SPA

BACKGROUND OF THE INVENTION

A spa (also commonly known as a "hot tub") is a therapeutic bath in which all or part of the body is exposed to forceful whirling currents of hot water. When located indoors and equipped with fill and drain features like a bathtub, the spa is typically referred to as a "whirlpool bath". Typically, the spa's hot water is generated when water contacts a heating element in a water circulating heating pipe system.

FIG. 1 shows prior art hot tub spa 1. Spa controller 7 is programmed to control the spa's water pumps 1A and 1B and air blower 4. In normal operation, water is pumped by water pump 1A through heater 3 where it is heated by heating element 5. The heated water then leaves heater 3 and enters spa tub 2 through jets 11. Water leaves spa tub 2 through drains 13 and the cycle is repeated.

The prior art spa shown in FIG. 1 includes safety protection devices designed to prevent dangerous overheating conditions. For example, a circuit incorporating temperature sensor 50 serves to protect spa 1 from overheating. Temperature sensor 50 is mounted to the outside of heater 3. Temperature sensor 50 is electrically connected to comparator circuit 51A and control circuit 52A, which is electrically connected to high limit relay 53A.

As shown in FIG. 1, power plug 54 connects heating element 5 to a suitable power source, such as a standard household electric circuit. Water inside heater 3 is heated by heating element 5. Due to thermal conductivity the outside of heater 3 becomes hotter as water inside heater 3 is heated by heating element 5 so that the outside surface of heater 3 is approximately equal to the temperature of the water inside heater 3. This outside surface temperature is monitored by temperature sensor 50. Temperature sensor 50 sends an electric signal to comparator circuit 51A corresponding to the temperature it senses.

When an upper end limit temperature limit is reached, such as about 120 degrees Fahrenheit, positive voltage is removed from the high temperature limit relay 53A, and power to heating element 5 is interrupted.

Water Pressure Sensor for Dry Fire Protection

Some conditions may cause little or no flow of water through the pipe containing heating element 5 during the heating process. These problems can cause what is known in the spa industry as a "dry fire". Dry fires occur when there is no water in heater 3 or when the flow of water is too weak to remove enough heat from the heating element 5. Common causes of low water flow are a dirty filter or a clogged pipe. For example, referring to FIG. 1, if a bathing suit became lodged in pipe 17 clogging the pipe, flow of water through heater 3 would be impeded and a dry fire could occur.

FIG. 1 shows water pressure sensor 15 mounted outside heater 3. As shown in FIG. 1, water pressure sensor 15 is located in a circuit separate from temperature sensor 50. It is electrically connected to spa controller 7, which is electrically connected to regulation relay 111.

In normal operation, when water pressure sensor 15 reaches a specific level, the electromechanical switch of the sensor changes its state. This new switch state indicates that the water pressure inside heater 3 is large enough to permit the heating process without the risk of dry fire. Likewise, in a fashion similar to that described for temperature sensor 50, when a lower end limit pressure limit is reached, such as about 1.5 –2.0 psi, positive voltage is removed from regulation relay 111, and power to heating element 5 is interrupted.

Tub Temperature Sensor

It is well known in the spa industry to place a tub temperature sensor inside the spa tub to help monitor and control the temperature of the water inside the spa tub. FIG. 1 shows temperature probe 112 located inside spa tub 2. A user of spa 1 can set the desired temperature of the water inside tub 2 to a predetermined level from keypad 200. Spa controller 7 receives an input from tub temperature probe 112. When the temperature of the water inside tub 2 reaches the predetermined level, spa controller 7 is programmed to remove the voltage to regulation relay 111, and power to heating element 5 will be interrupted.

In order to function properly, temperature probe 112 must be correctly mounted to the side of spa tub 2. FIG. 2 shows a cut-out perspective view of the side of spa tub 2. While water is contained in the inside of spa tub 2, ambient air is allowed to contact the area underneath spa tub skirt 2A. Hole 150 is drilled into the side of spa tub 2 below the water level for the purpose of mounting a temperature probe. FIG. 3 shows a side view of spa tub 2 and temperature probe 112 and prior art temperature probe mount assembly 151.

It is well known in the spa industry to use thermistors to measure the temperature of the water inside the spa tub. The thermistor changes its resistance with changes in temperature. Thermistors typically work over a relatively small temperature range and can be very accurate and precise within that range. An exemplary thermistor temperature probe 112 is made by Gecko Electronics, Inc with offices in San Marcos, Calif. (part no. 9920-400262). It is approximately 2 inches long and 3/8 inches in diameter.

Prior art temperature probe mount assembly 151 is manufactured by Waterway Plastics with offices in Oxnard, Calif. (part no. 400-4360). As shown in FIG. 3, temperature probe mount assembly 151 consists of socket 152, nut 153, O-ring 154 and rear nut 155. FIG. 4 shows temperature probe 112 mounted to the side of spa tub 2 utilizing temperature probe mount assembly 151. As shown in FIG. 4, an ideal distance for the tip of temperature probe 112 to extend beyond the edge of temperature probe mount assembly 151 into the water inside spa tub 2 is approximately 1/4 inch. However, this exposes rear end 112A of temperature probe 112 to ambient air underneath spa tab skirt 2A. If a spa is located in a cold area, such as at a ski-resort during the winter, the cool air contacting rear end 112A of temperature probe 112 could cause a signal to be sent to spa controller 7 (FIG. 1) that is not representative of the true temperature of the water inside spa tub 2. This could cause heating element 5 to stay on longer than desired, causing a potential safety hazard to the user of the spa. A prior art solution to the problem of protecting rear end 112A from ambient cold air is to spray the inside of spa skirt 2A with foam insulation. However, the foam insulation has been known to deteriorate over time. Or, during maintenance operations, workers have been known to rip the foam insulation out without replacing it when the maintenance is over.

FIG. 5 illustrates another potential problem associated with prior art temperature probe mount assembly 151. During the installation process, it is possible for temperature probe 112 to be incorrectly installed so that its tip extends too far out into the inside of spa tub 2. A user of the spa may inadvertently bump into temperature probe 112 and damage it or, by bumping it, cause it to damage or crack temperature probe mount assembly 151. It is also possible for temperature probe 112 to be pressed so far forward that it is pushed beyond O-ring 154 (FIG. 3) causing the seal to break.

Also, while sitting inside the spa, a user may notice that temperature probe 112 is extending too far. He then may decide to press it back it with his finger. By mistake, or due to the possibility that the user may not know the correct distance that temperature probe 112 should extend beyond temperature probe mount assembly 151, the user could press temperature probe 112 too far so that it is in the position shown in FIG. 6. In FIG. 6, a large portion of rear end 112A is exposed is exposed to ambient cool air inside spa tub skirt 2A. The front tip of probe 112 has been pressed in so that it is barely in contact with spa water. Under these conditions, temperature probe 112 could cause a signal to be sent to spa controller 7 (FIG. 1) that is representative of a temperature that is far cooler than the true temperature of the water inside spa tub 2. This could cause heating element 5 to stay on longer than desired, causing a potential safety hazard to the user of the spa.

FIG. 7 shows prior art temperature probe mount assembly 156 with blocking strip 157. Temperature probe mount assembly 156 is manufactured by Balboa Instruments, Inc. (part no. 30387WHT). Blocking strip 157 prevents an installer from pressing temperature probe 112 too far into temperature probe mount assembly 156. However, it does not prevent cool ambient air from contacting rear end 112A. Nor does it prevent a user of the spa from pressing the front end of temperature probe 112 and moving it back into the area underneath spa skirt 2A, as was shown in FIG. 6. Another problem with the Balboa device is that blocking strip 157 prevents water from moving freely around the tip of temperature probe 112, thereby distorting its readings. Vico Products, Inc. with offices El Monte, Calif. also makes a temperature probe mount assembly that has a blocking device similar to blocking strip 157. However, it also has the same limitations.

What is needed is a better temperature probe mount assembly.

SUMMARY OF THE INVENTION

The present invention provides a device for measuring the temperature of the water inside a water container. A temperature probe that defines a front end and a rear end has its front end exposed to water inside the water container. A temperature probe mount mounts the temperature probe to the side of the water container and allows access of the front end of the temperature probe to the water inside the water container. A temperature probe insulator fits over the rear end of the temperature probe. The temperature probe insulator attaches to the temperature probe mount and prevents rearward motion of said temperature probe. In a preferred embodiment, the water container is a spa. In a preferred embodiment, the temperature probe insulator is made of a rubbery substance.

BRIEF DESCRIPTION OF THE DRAWINGS

FIG. 8 shows an exploded view of a preferred embodiment of the present invention.

FIG. 9 shows an end view of the rubber boot.

FIG. 10 shows a side view of the rubber boot.

FIGS. 11–15 show a sequence describing how a temperature probe is mounted utilizing a preferred embodiment of the present invention.

DETAILED DESCRIPTION OF A PREFERRED EMBODIMENT

A preferred embodiment of the present invention is described by reference to FIGS. 8–15.

Figure 15:
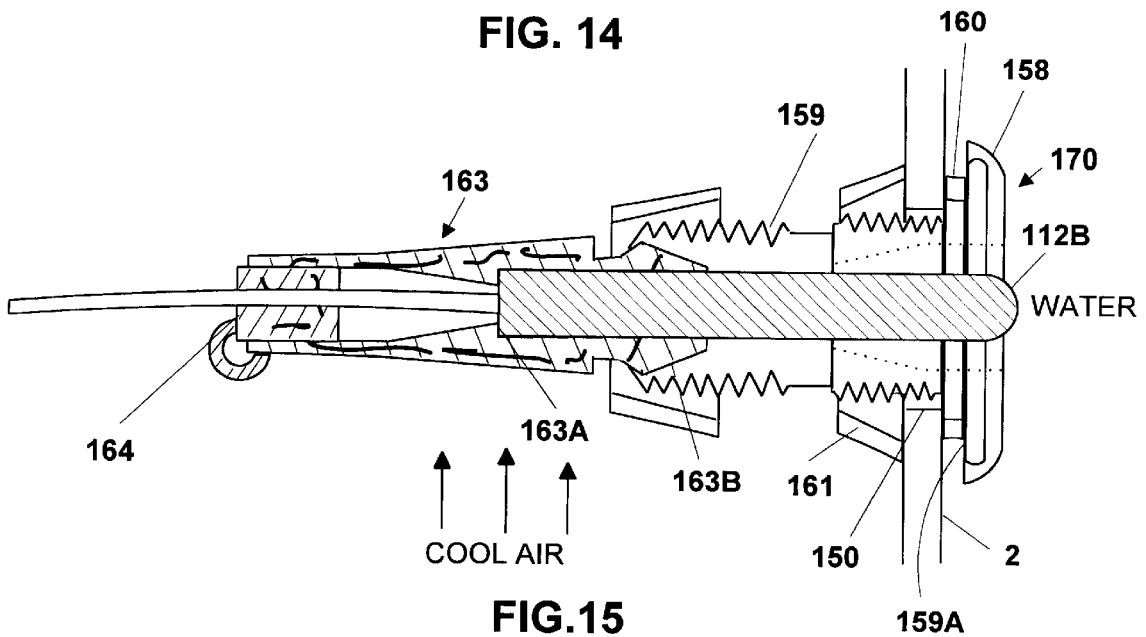

FIG. 15 shows the temperature measuring device mounted to the side of spa tub 2. The device comprises rubber boot 163, which helps secure temperature probe 112 so that it is at an optimum position inside spa tub 2. Abutment 163A prevents temperature probe 112 from being pushed in a direction out of the spa. Rubber boot 163 also provides thermal insulation that insulates temperature probe 112 from cool ambient air.

FIG. 8 shows an exploded view of components of a preferred temperature probe mount assembly 170. FIG. 8 shows decorative cap 158, socket 159, gasket 160, nut 161, stopper nut 162, rubber boot 163, end plug 164 and temperature probe 112.

FIG. 9 shows an end view of rubber boot 163 and FIG. 10 shows a detailed view of the inside of rubber boot 163. Rubber boot 163 has rubber end plug 164 attached to its end.

FIGS. 11–14 show a sequence illustrating how temperature probe 112 is installed.

In FIG. 11, temperature probe 112 has been pushed completely through rubber boot 163.

Figure 1:
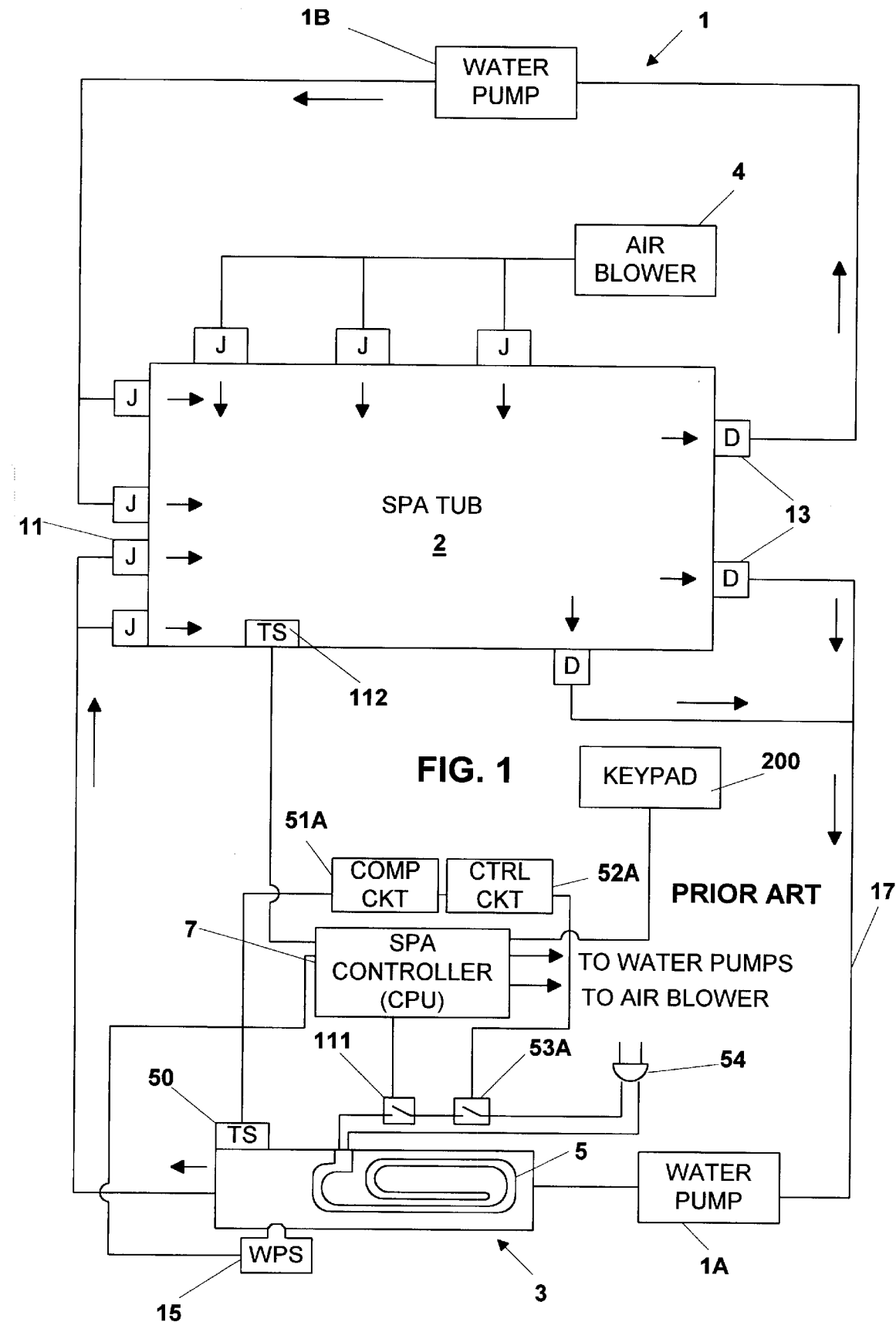
FIG. 1 shows a prior art hot tub spa.
Figure 2:
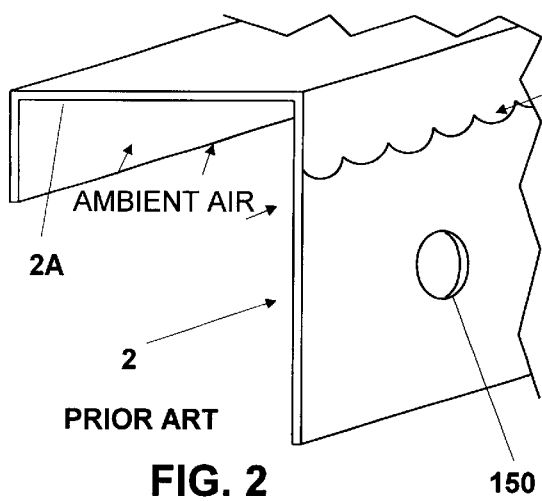
FIG. 2 shows cut-out perspective view of a prior art spa tub.
Figure 3:
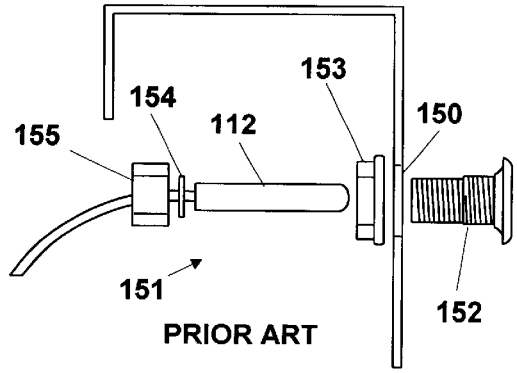
FIG. 3 shows an exploded view of a prior art temperature probe mount assembly.
Figure 4:
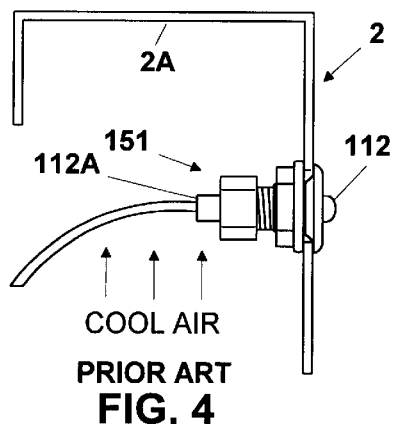
FIG. 4 shows a prior art temperature probe mount assembly.
Figure 5:
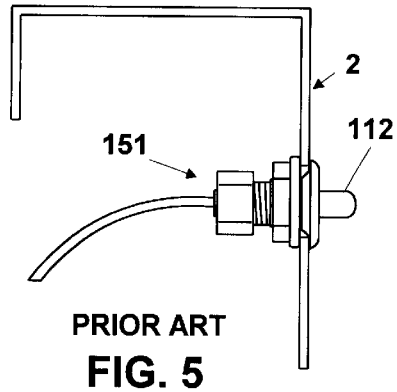
FIG. 5 shows a temperature probe incorrectly positioned with the prior art temperature probe mount assembly.
Figure 6:
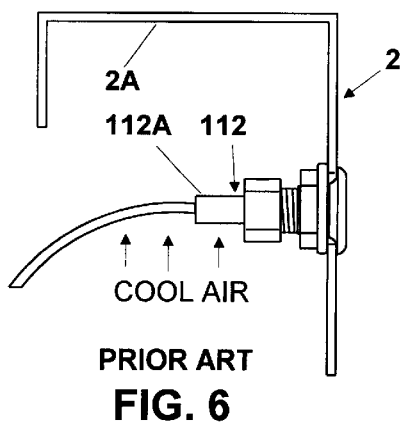
FIG. 6 shows a temperature probe incorrectly positioned with the prior art temperature probe mount assembly.
Figure 7:
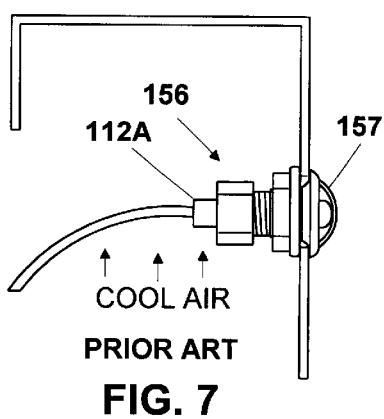
FIG. 7 shows a prior art temperature probe mount assembly with a blocking strip.
Figure 12:
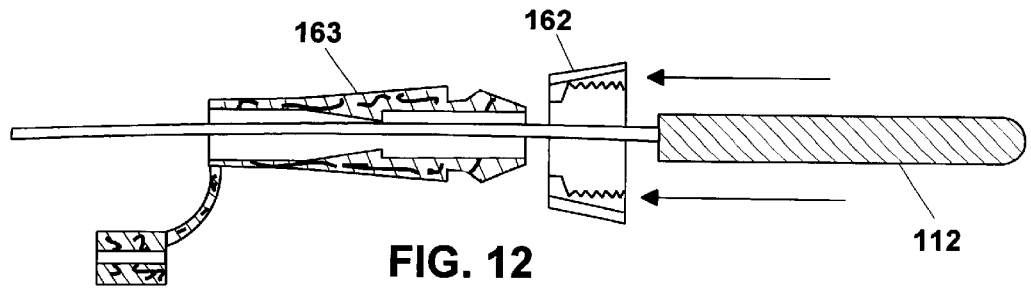

In FIG. 12, stopper nut 162 has been slid over temperature probe 112 and moved towards rubber boot 163.

Figure 13:
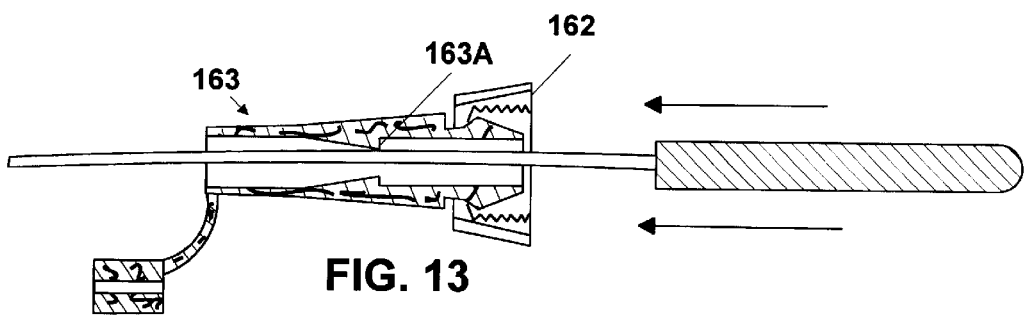

In FIG. 13, stopper nut 162 has been snapped over the front end of rubber boot 163. Temperature probe 112 is being moved towards boot 163.

Figure 14:
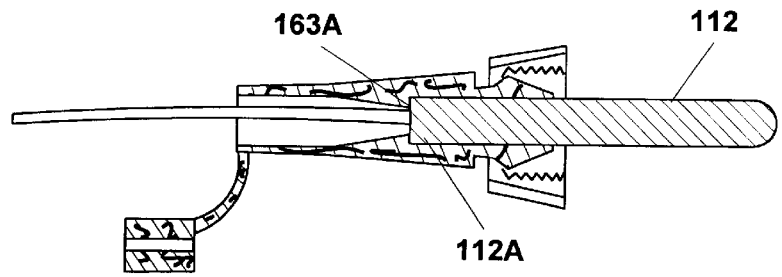

In FIG. 14, temperature probe 112 has been moved back inside rubber boot 163 so that rear end 112A is pressed against abutment 163A. Abutment 163A prevents temperature probe 112 from being slid back any further.

In FIG. 15, temperature probe 112 has been mounted to the side of spa 2 via temperature probe mount assembly 170. Socket 159 has been slid through gasket 160 and hole 150. Nut 161 has then been threaded onto the end of socket 159, thereby securing socket 159 to the side of spa 2. Decorative cap 158 has been snapped onto lip 159A of socket 159. Stopper nut 162 has then been threaded onto the end of socket 159, thereby securing temperature probe 112 to temperature probe mount assembly 170. End plug 164 has been inserted into the back end of rubber boot 163. End plug 164 helps prevent ambient cool air from contacting temperature probe 112. Front portion 163B of rubber boot 163 aids in securing temperature probe 112 inside socket 159 and also acts as a seal, helping to prevent the leakage of spa water.

Water leakage around the circumference of temperature probe 112 is prevented by the front portion of boot 163 pressing on the circumference of temperature probe 112. Pressure that causes rubber boot 163 to press on the circumference of temperature probe 112 is caused by stopper nut 162 and socket 159. Water leakage by the outside of socket 159 is prevented by pressure on gasket 160 between lip 159A of socket 159 and the spa wall applied by the tightening of nut 161 against the inside of the spa wall.

Water inside spa tub 2 is allowed to contact temperature probe 112 at its tip 112B and along the front portion of probe 112 that is exposed by the internal radius of decorative cap 158 and socket 159 (indicated by the dashed lines in FIG. 15).

As explained above, once temperature probe 112 is installed a user cannot press it backwards due to abutment 163A. Also, the effect of cool ambient air on temperature probe 112 is greatly diminished due to the insulation provided by rubber boot 163 and end plug 164.

Although the above-preferred embodiments have been described with specificity, persons skilled in this art will recognize that many changes to the specific embodiments disclosed above could be made without departing from the spirit of the invention. For example, although rubber boot was described as being made out of rubber, one of ordinary skill in the art would recognize that it could be made from other rubbery substances such as polyurethane. Also, although the use of the present invention was described in detail as being applied to a hot tub spa, one of ordinary skill in the art will recognize that it can be used measure the temperature of other devices that contain water. For example, it could be used to mount a temperature probe to an outside swimming pool or an outside fish pond. Both the swimming pool and out door fish pond require the water to be accurately maintained at a warm temperature, regardless of the temperature of the surrounding ambient air. Also, one of ordinary skill in the art could apply the present invention to a bathtub, an aquarium for fish or an aquarium for lobster. Therefore, the attached claims and their legal equivalents should determine the scope of the invention.

We claim:

1. A device for measuring the temperature of the water inside a water container, comprising:
    A) a temperature probe defining a circumference, a front end and a rear end, wherein said front end is exposed to water inside the water container, and said rear end is not exposed to water inside the water container,
    B) a temperature probe mount that mounts said temperature probe to the side of the water container exposing said front end of said temperature probe to the water inside the water container, and
    C) a rubbery temperature probe insulating boot fitted over said rear end of said temperature probe and attached to said temperature probe mount so as to prevent rearward motion of said temperature probe, wherein said temperature probe mount comprises:
        1) a socket,
        2) a nut, wherein said nut threads onto said socket and secures said socket to the water container, and
        3) a stopper nut, wherein said stopper nut threads onto said socket and fits over said rubbery temperature probe insulating boot securing said rubbery temperature probe insulating boot to said temperature probe mount and causing said rubbery temperature probe insulating boot to press on said circumference of said temperature probe,
    wherein water leakage around said circumference of said temperature probe is prevented by said rubbery temperature probe insulating boot pressing on said circumference of said temperature probe.

2. The device as in claim 1, wherein said water container is a spa.

3. The device as in claim 1, wherein said temperature probe is a thermistor.

4. The device as in claim 1, wherein said rubbery temperature probe insulating boot comprises:
    A) an insulator front end, that fits over said rear end of said temperature probe,
    B) an insulator rear end,
    C) an end plug, wherein said end plug plugs said insulator rear end to insulate said temperature probe, and
    D) an abutment, wherein said rear end of said temperature probe is prevented from rearward motion by said abutment.

5. A device for measuring the temperature of the water inside a water container, comprising:
    A) a temperature probe means for sensing temperature, said temperature probe means defining a circumference, a front end and a rear end, wherein said front end is exposed to water inside the water container, and said rear end is not exposed to water inside the water container,
    B) a temperature probe mounting means for mounting said temperature probe to the side of the water container exposing said front end of said temperature probe to the water inside the water container, and
    C) a rubbery temperature probe insulating boot means for providing insulation, wherein said rubbery temperature probe insulating boot means is fitted over said rear end of said temperature probe means and attached to said temperature probe mounting means so as to prevent rearward motion of said temperature probe means, wherein said temperature probe mounting means comprises:
        1) a socket,
        2) a nut, wherein said nut threads onto said socket and secures said socket to the water container, and
        3) a stopper nut, wherein said stopper nut threads onto said socket and fits over said rubbery temperature probe insulating boot means securing said rubbery temperature probe insulating boot means to said temperature probe mount means and causing said rubbery temperature probe insulating boot means to press on said circumference of said temperature probe means,
    wherein water leakage around said circumference of said temperature probe means is prevented by said rubbery temperature probe insulating boot means pressing on said circumference of said temperature probe means.

6. The device as in claim 5, wherein said water container is a spa.

7. The device as in claim 5, wherein said temperature probe means is a thermistor.

8. The device as in claim 5, wherein said rubbery temperature probe insulating boot means comprises:
    A) an insulator front end, that fits over said rear end of said temperature probe means,
    B) an insulator rear end,
    C) an end plug, wherein said end plug plugs said insulator rear end to insulate said temperature probe means, and
    D) an abutment, wherein said rear end of said temperature probe means is prevented from rearward motion by said abutment.

* * * * *